Sept. 8, 1942.  R. V. DERRAH  2,295,337
AUTOMATIC VARIABLE SPEED POWER TRANSMISSION
Filed Aug. 4, 1940  4 Sheets-Sheet 2
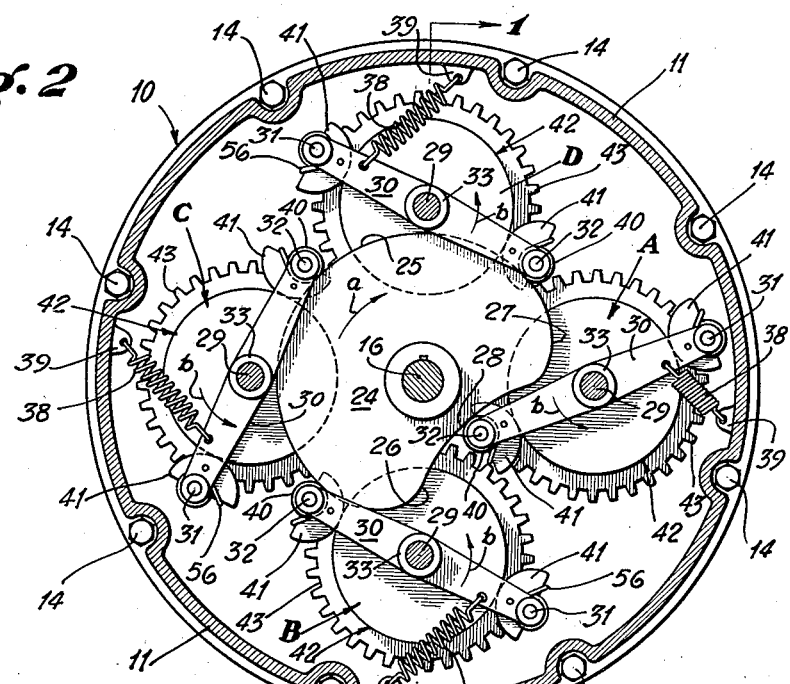
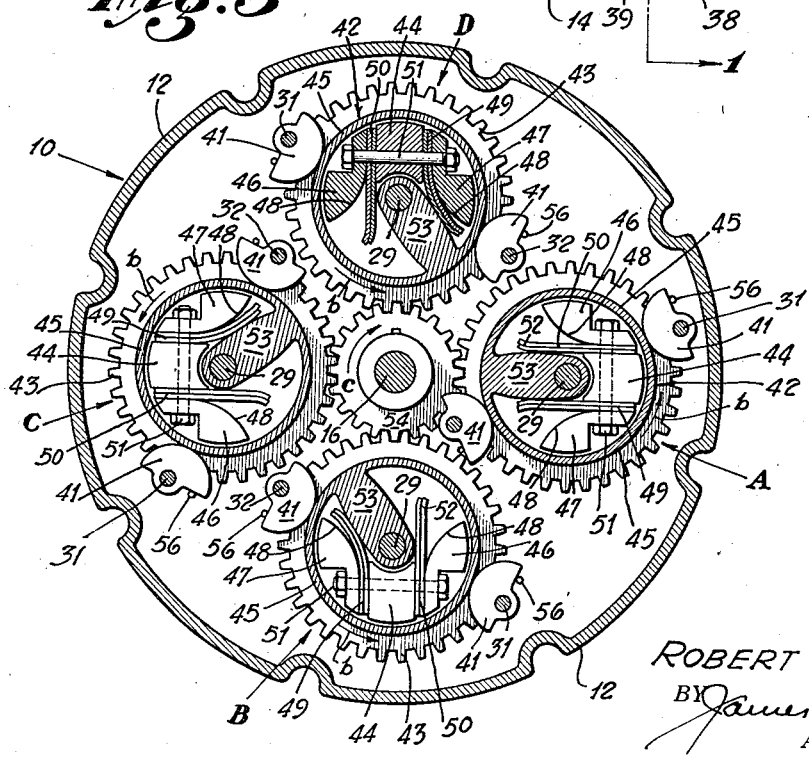
INVENTOR:
ROBERT V. DERRAH,
BY James M. Abbott
ATTORNEY.

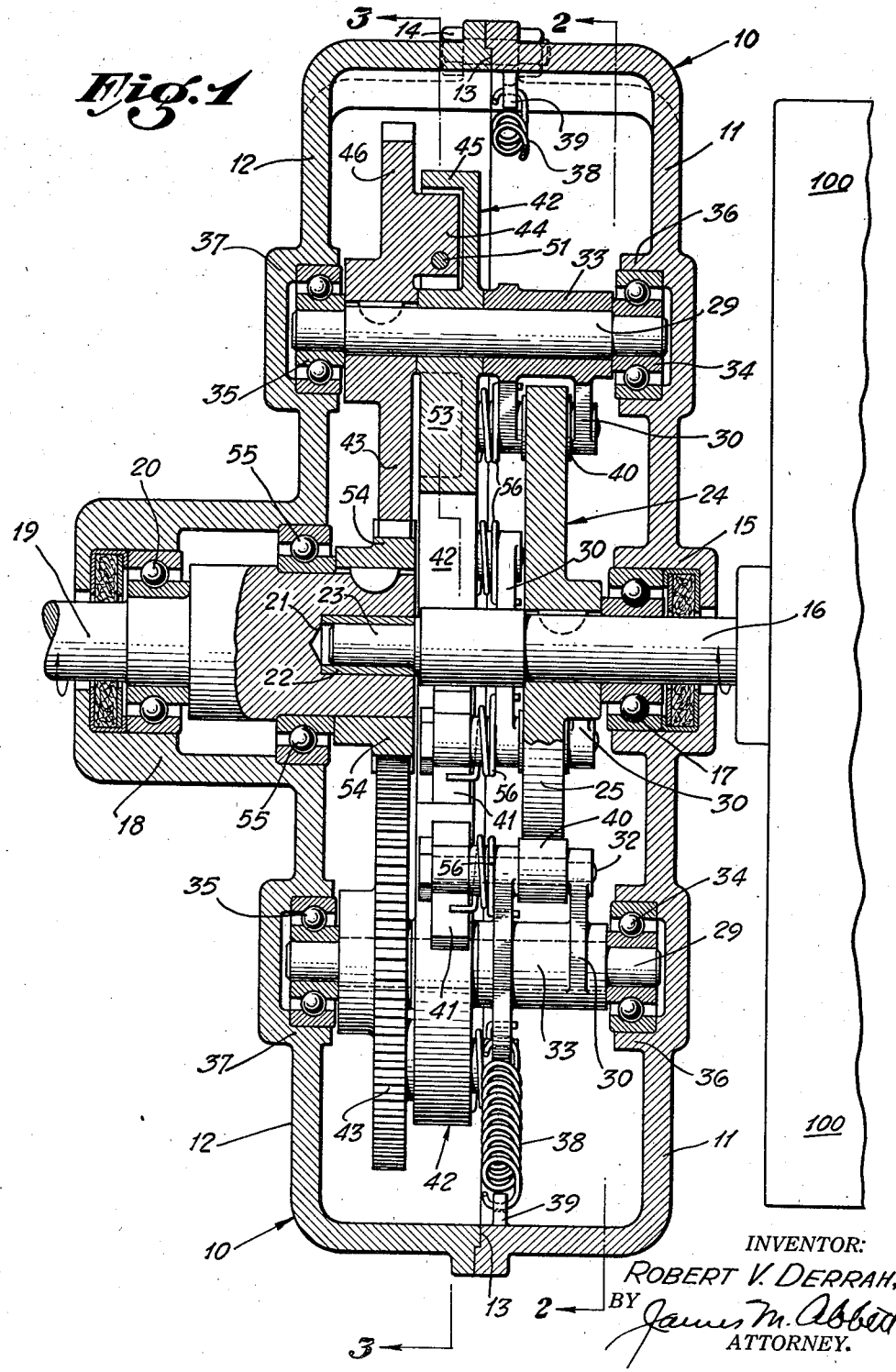

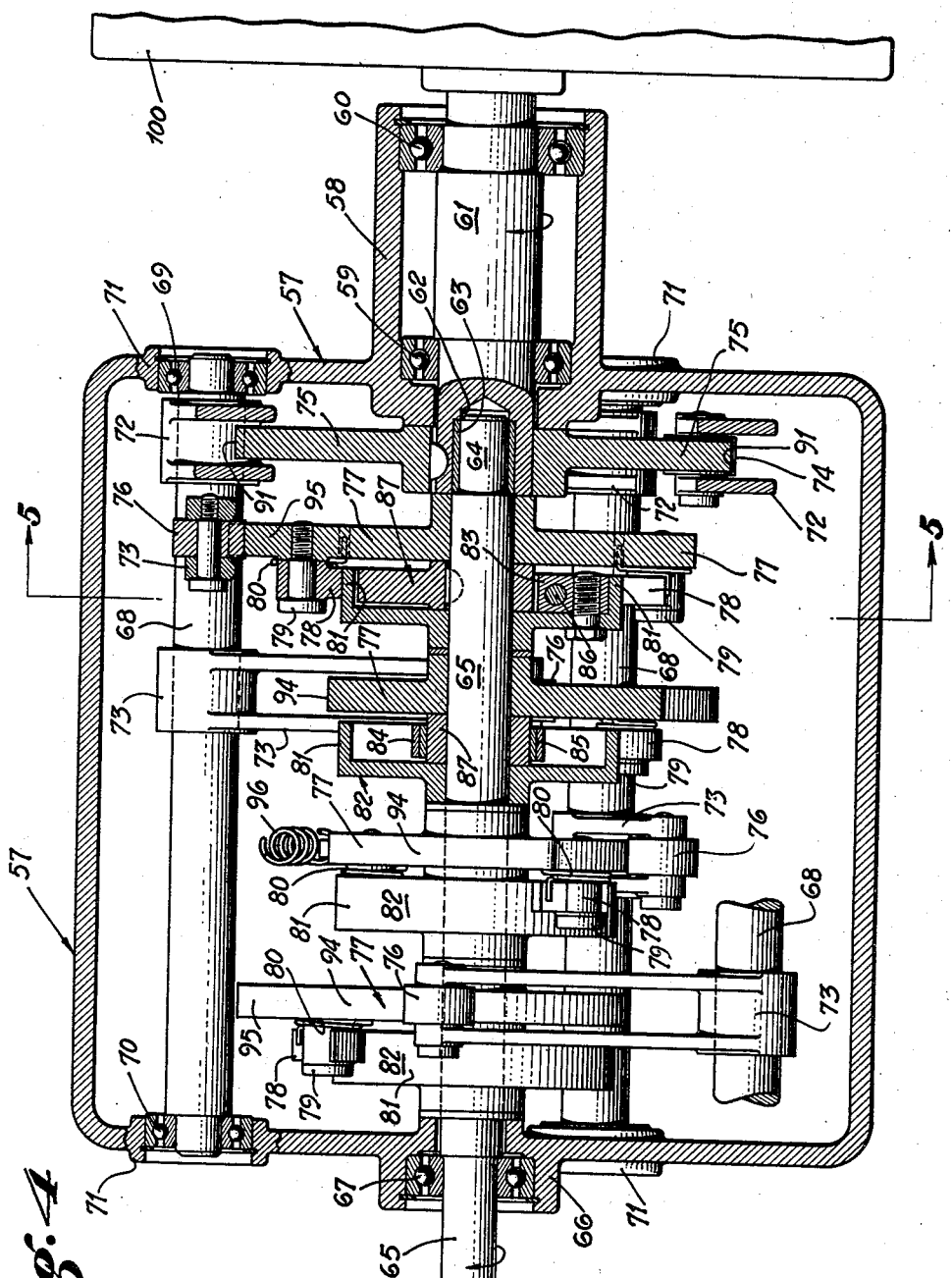

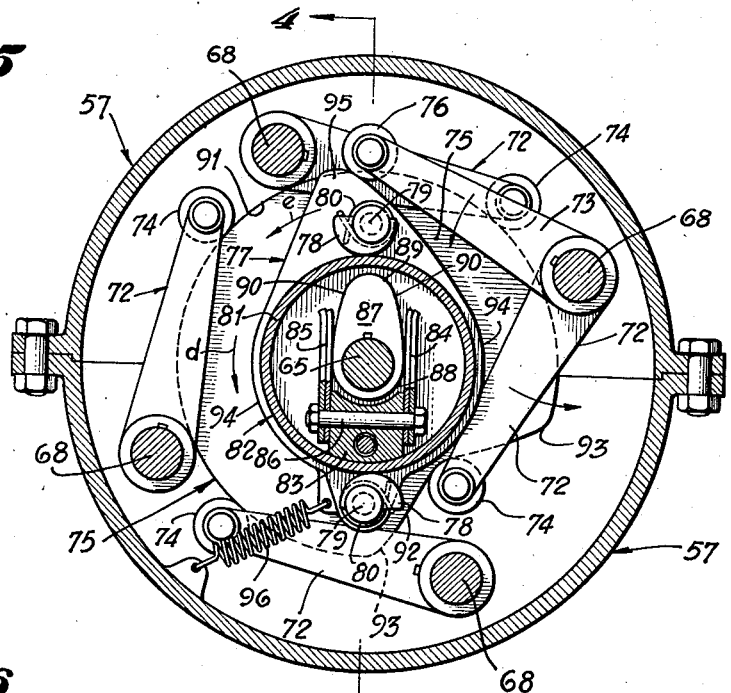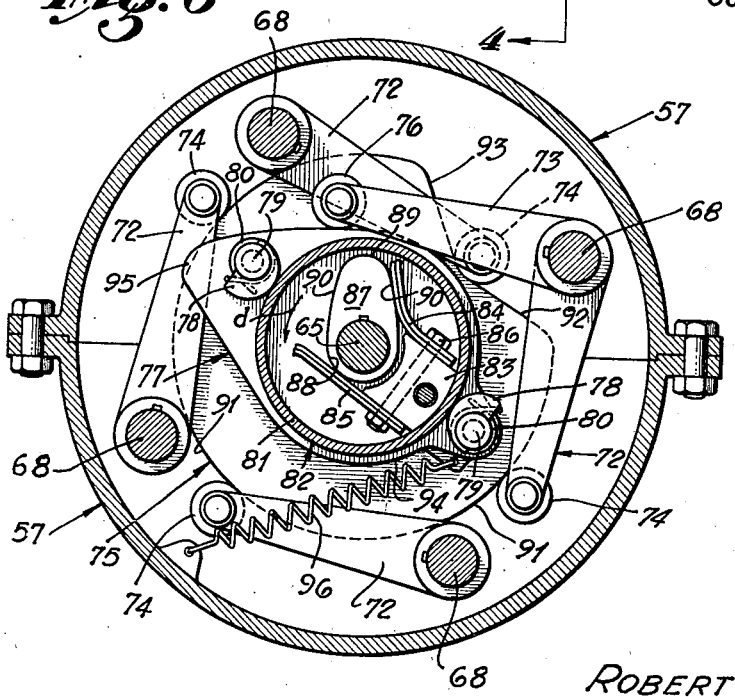

Patented Sept. 8, 1942

2,295,337

UNITED STATES PATENT OFFICE 2,295,337

AUTOMATIC VARIABLE SPEED POWER TRANSMISSION

Robert V. Derrah, Beverly Hills, Calif.

Application August 4, 1940, Serial No. 351,416

4 Claims. (Cl. 74—113)

This invention relates to power transmission mechanism and particularly pertains to an automatic variable speed power transmission.

In the operation of various power driven apparatus, such for example as an automobile, it is necessary to interpose a speed change transmission between the prime mover and the driven structure. Usually this transmission is of the gear shift type in which definite gear ratios are established between a driving and driven shaft as the speed of the vehicle is accelerated. Various transmission units have been designed in an attempt to progressively change the ratio of the driving shaft to the driven shaft so that gradual acceleration would be created. These structures for the most part have been complicated and have required considerable repair. It is the principal object of the present invention, therefore, to provide an automatic variable speed power transmission which will require no attention from the operator and in which rotation of the driving shaft at any speed greater than the speed of rotation of the driven shaft produces a torque tending to rotate the driven shaft proportionate to the difference in speeds existing between the two shafts at any moment, it being a further object to provide a structure in which the power imparted by the driving shaft and tending to rotate the driven shaft when not consumed by the driven shaft will be returned to the driving shaft, thus conserving the power output of a prime mover. It is a further object of the present invention to provide a structure of the type here disclosed which is simple in construction, compact in design and is not likely to get out of order.

The present invention contemplates the provision of a variable speed transmission, which acts automatically to produce driving ratios between a driving shaft and a driven shaft at any speed within the range of operation of the apparatus, and which structure is equipped with impulse type power transmitting means acting to impart driving action from the driving shaft to the driven shaft or to return the driving force to the driving shaft in the event that the power is not utilized by the driven shaft.

The invention is illustrated by way of example in the accompanying drawings, in which:

Figure 1 is a view in central section, as seen on the line 1—1 of Fig. 2, through the transmission with which the present invention is concerned, disclosing its housing and the operating mechanism therein.

Fig. 2 is a view in transverse section through the structure as seen on the line 2—2 of Fig. 1 and disclosing a cam arrangement.

Fig. 3 is a view in transverse section as seen on the line 3—3 of Fig. 1 and shows the driving elements.

Fig. 4 is an enlarged view in longitudinal section through a modified form of the invention as seen on the line 4—4 of Fig. 5, showing the drive and driven shafts and an intermediate transmission mechanism.

Fig. 5 is a view in transverse section as seen on the line 5—5 of Fig. 4, showing one of the cams with the drive mechanism in its non-driving position.

Fig. 6 is a view in transverse section taken on the same line 5—5 of Fig. 4 and showing the same cam of the structure with the driving elements in action.

Referring more particularly to the drawings, 10 indicates a transmission housing which is here shown as formed in two halves 11 and 12 which are parted along a central parting line 13 and are secured together by bolts 14. A central bearing hub 15 is formed in the end wall of the housing section 11 and receives a drive shaft 16 which is connected to a suitable prime mover not shown in the drawings. Anti-friction bearings 17 are mounted within the hub 15 to support the shaft 16. In axial alignment with the shaft 16 and formed as part of the housing section 12 is a bearing hub 18 through which a driven shaft 19 extends. The driven shaft 19 is supported by an anti-friction bearing structure 20. The inner end of the shaft 19 is enlarged and is formed with a central bore 21 carrying a bushing 22 to receive a reduced end 23 of the driving shaft 16. Mounted upon the driving shaft 16 adjacent to the hub 15 is an impulse cam 24. The configuration of this cam is more particularly shown in Fig. 2 of the drawings, where it will be seen to be substantially kidney-shaped. It is provided with a concentric marginal face 25 representing the swell of the cam. This circumferential length represents a substantial semicircle terminating in surfaces 26 and 27 between which occurs a dwell 28. Disposed upon centers spaced equidistant from each other and upon center lines intersecting the axis of the drive shaft 16 are counter-shafts 29. These shafts carry rocker arms 30 having pins 31 and 32 at their opposite ends. The rocker arms are preferably formed integral with hub structures 33 through which the shafts 29 extend. As shown in Fig. 1 of the drawings the shafts 29 are reduced at their opposite ends and receive anti-friction bearings 34 and 35. The bearing 34 is mounted within a bearing boss 36 of the housing part 11, and the bearing 35 is mounted in a similar boss 37 of the housing part 12. Adjacent to the outer ends of the rocker arms 30 are tension springs 38 which are connected to lugs 39 carried on the outer circumferential wall of the housing section 11. The pins 32 carry cam rollers 40 which ride upon the peripheral surface of the cam 24 so that the rocker arms 30 will oscillate around the axes of the counter-shafts 29 upon which they are mounted.

The pins 31 and 32 carry semicircular shoes 41 which are mounted eccentrically of the pins, the short radius being opposed to the direction of rotation of impulse drums 42. The drums 42 are freely mounted upon the counter-shafts 29 adjacent to the hubs 33 of the rocker arms 30. The rocker arms 30 and the impulse drums 42 are freely mounted upon the counter-shafts 29. Keyed to the counter-shafts 29 are spur gears 43 which carry bosses 44 designed to project into the drums 42, it being understood that the drums 42 have an overhanging cylindrical portion 45 which extends toward the gears 43 and over the bosses 44. Carried by the gears 43 and projecting outwardly from the said face thereof upon which the bosses 44 occur are follower lugs 46 and 47. These lugs have arcuate faces 48, the base of the lugs being spaced from the side faces of the bosses 44 to accommodate leaf spring impulse members 49 and 50, which are secured in position by a bolt 51. The springs, as shown at position A in Fig. 3 of the drawings, are indicated as being parallel to each other and as being disposed at opposite sides of the counter-shaft 29. The fixed ends of the springs are on one side of the counter-shaft and their free ends extend in parallel planes to points at the opposite side of the counter-shaft where they terminate in outwardly curved end portions 52. Thus, the pair of impulse springs 49 and 50 straddle the counter-shaft. They also straddle a radial arm 53 which is formed as a part of the drum 42 and extends from its hub through which the counter-shaft 29 projects to the cylindrical flange 45 of the drum. The opposite sides of the arms 53 are arcuate and are slightly convexed so that the impulse springs 49 and 50 may have a rolling motion therealong as the transmission operates and as the elements move to their various positions, as indicated at A, B, C and D in Fig. 3.

The shoes 41, as will be hereinafter described, are designed to engage the cylindrical flange 45 of the drum 42 in a manner to impart rotation to the individual drums 42. These drums will impart rotation to the gears 43 through the impulse springs 49. The gears 43 are in mesh with a gear 54 keyed onto the enlarged end of the driven shaft 19. At a point adjacent to the position of this gear an anti-friction bearing 55 is provided to support the shaft. The individual shoes 41 are caused to engage the surface of the flange 45 of the drum by reason of their eccentric mounting and spring members 56 which urge the shoes toward a binding position.

In the form of the invention shown in Figs. 4, 5 and 6 of the drawings a different construction is shown having the same purpose in mind. Referring particularly to Fig. 4, a housing 57 is provided, which is suitably parted along a line not shown in the drawings. At one end of this housing a bearing hub 58 is formed. This hub carries anti-friction bearings 59 and 60 through which a drive shaft 61 extends. The inner end of this drive shaft is formed with a counterbore 62 to receive a bushing 63. A reduced end 64 of a driven shaft 65 extends into the bushing while the opposite end of the driven shaft 65 is supported in a bearing hub 66 carrying anti-friction bearings 67. Extending parallel to the shaft 65 and from end to end of the housing 57 are counter-shafts 68, four of which are shown. These shafts are spaced equidistant from each other and are circumferentially arranged with relation to the driven shaft 65. Anti-friction bearings 69 and 70 carried in bearing hubs 71 at opposite ends of the housing support the counter-shafts 68. Each of the counter-shafts 68 carries a primary rocker arm 72 and a secondary rocker arm 73. The rocker arms 72 extend in one direction from the counter-shaft 68 and the rocker arms 73 extend in a direction substantially at right angles to the primary rocker arms 72. The primary rocker arms 72 carry cam rollers 74 which ride along the peripheral edge of a drive cam 75. The drive cam 75 is keyed upon the drive shaft 61. The secondary rocker arms 73 carry cam rollers 76 which are maintained in contact with an impulse cam 77. By reference to Fig. 4 of the drawings it will be seen that there is only one drive cam 75 since all of the primary rocker arms 72 may be in the same plane. There are four secondary impulse cams 77, one for each of the four secondary rocker arms. It is to be understood in connection with the explanation of the form of structure shown in Figs. 1, 2 and 3, as well as the form of structure shown in Figs. 4, 5 and 6, that the number of impulse elements may be any number desired, although in both forms of the invention four are shown.

The impulse cams 77 carry shoes 78 which are disposed upon diametrically opposite sides of the axis of the shaft 65. These shoes are similar in configuration and design to the shoes 41 previously described, and are mounted upon pins 79. Coil springs 80 are provided to hold these shoes in tension against the annular flange 81 of impulse drums 82. The drums 82 are freely rotatable upon the shaft 65. These drums carry a radial lug 83, at the opposite sides of which impulse spring blades 84 and 85 are secured by a bolt 86. These blades are spaced a distance apart, as shown in Fig. 5, and straddle the shaft 65. Secured upon the shaft 65 is an impulse cam 87. The shaft 65 extends through one end of this cam, that end having a semicircular surface 88 concentric with the axis of the shaft. The cam extends radially from the shaft 65 and terminates in an opposite end which provides a semicircular surface 89, which is struck on a shorter radius than that of the surface 88. The intermediate side faces of the cam are flat, as indicated at 90, and tapered toward the free end of the cam. The cam will act to cause the impulse blades 84 to flex, as shown in Fig. 6, during the operation of the machine.

Referring to the configuration of cam 75, it will be seen in Figs. 5 and 6 of the drawings, that this cam has an outer concentric face 91 which extends for a distance slightly greater than three-quarters of the circumference, and that inwardly converging faces 92 and 93 form a dwell into which the rollers 74 will move as the cam rotates.

The cams 77 are of a configuration having a circular face concentric with the axis of shaft 65 for substantially three-quarters of the diameter of the cam as indicated at 94, with the remainder of the surface of the cam forming a substantially triangular swell 95, the structure operating in a manner to be hereinafter described. Each of the cam structures 77 is provided with a spring 96 by which the cam is yieldably urged in a clockwise direction as shown in Fig. 6.

In the operation of the form of the invention shown in Figs. 1 to 3, inclusive, the structure is assembled as there indicated and the driving shaft 16 is connected with a suitable prime mover while the driven shaft is connected to the apparatus to be driven. It will be assumed for the purpose of this description that the prime mover is an automobile engine and that the apparatus to be driven is the rear axle of the automobile. Thus, when the engine clutch is thrown in rotation will be imparted to the shaft 16, tending to drive it in a clockwise direction. As this shaft rotates it will rotate the cam 24 in the direction of the arrow $a$ indicated in Fig. 2. The cam rollers 40 will thus be forced to ride along the periphery of the cam 24, it being understood that the surfaces 26 and 27 of the cam are designed to impart uniform acceleration to the rollers 40 and the members carried by them. For purposes of explanation, it will be assumed that the impulse structure indicated at the station A in Figs. 2 and 3 is in the initial position shown in Fig. 2 with the roller 40 resting on the surface of the dwell 28, the rollers 40 being yieldably held by the springs 38. As the rocker arm 30 at station A oscillates, it will swing in the direction of the arrow $b$. This will tend to move the shoes 41 around and along the circumference of the cylindrical portion 45 of the drum 42, and since the shoes are frictionally held against this surface by the springs 56 while being eccentrically mounted upon the pins 31 the shoes 41 will grip the drum 42 and impart rotation to the drum in the direction of the arrow $b$. This rotating movement will continue while the face 27 of the cam 24 travels in contact with the roller 40. The result will be that the drum 42 will rotate a circumferential distance as produced by the swell of the cam. The drum is formed with the radial arm 53 and will cause the arm to swing from the position shown at station A in Fig. 3 to the position shown at station B. This will flex the spring impulse blade 49 and impart a tendency to rotation to the gear 43 which is associated with the blades. The result will be that the gear 43 will tend to rotate in the same direction as the drum tends to rotate, which was in the direction of the arrow $b$, and that it will simultaneously impart a tendency to rotate in the direction of the arrow $c$ to the gear 54, which is keyed to the driven shaft 19. This will impart a tendency to rotate the driven shaft in the same direction as that of the drive shaft. In the event that the resistance of the driven shaft 19 to the torque imposed upon it through the impulse mechanism and the drive shaft 16 is greater than that torque, then the spring impulse blades 49 will alternately flex and unflex so that the energy given up by the blades in their unflexing action to the drive shaft through the rocker arms and the cams will be imparted to the drive shaft. If, however, the driven shaft 19 is impelled by the torque delivered to it through the impulse blades 49 the gears 43 will rotate and any of the drums 42 which are not under torque, such as would be the case at station A, would be free to move in a counter-clockwise direction. It will be recognized that at the end of the rocking action of the rocker arms 30 the impulse stored within the drums 42 will cause them to rotate freely and to release the gripping action of the shoes 41. Under these conditions the drums 42 rotate at the speed of the gears 43 until the drums are again gripped by the shoes 41, at which time the speed of the drums 42 will increase momentarily, flexing the blades 49 as the direction of rotation determines and thus impart a torque impulse to the gears 43 and the final driven gear 54.

Referring to Figs. 4, 5 and 6, the operation of that structure involves the application of power to the drive shaft 61. This will impart rotation to the drive cam 75 in the direction of the arrow $d$, as indicated in Fig. 5 of the drawings. As the primary follower arms 72 with their cam rollers 74 ride along the surface of the drive cam 75 the counter-shafts 68 will be rotated. This will cause the primary rocker arms 72 to swing outwardly and the secondary rocker arms 73 to swing inwardly. The inward swinging motion of the rocker arms 73 will act against the swell 94 of a corresponding cam 74 and cause the cam to swing in the direction of the arrow $e$ in Fig. 5. As this cam swings its shoes 78 will grip the face of a corresponding drum 82, thereby imparting motion to the impulse blades 84 to engage a corresponding cam 87 upon the shaft 65 and to rotate the shaft.

The operating characteristics of both types of structures are substantially the same, since in this particular device the four impulse units will impart torque to the driven shaft consecutively.

It will be recognized that many variations can be made in structures embodying the present invention without departing from the principle thereof. For example, it is recognized that the cams may be grooved so that they will have positive action at all times without requiring springs to operate upon the rocker arms. Furthermore, the shoes which engage the circumference of the drums may be replaced by pawls which might engage ratchet teeth on the drums, or in fact friction elements might be used to replace the shoes in order to impart unidirectional movement of the drums. It is also within the contemplation of the present invention that various energy storing devices might be used in place of the spring impulse blades, such as a fluid compressing chamber, rubber or the like. It will be understood that a fly wheel 100 or other suitable means may be attached to the drive shafts.

It will thus be seen that by the use of the transmission here shown, it is possible to impart a torque force from a driving shaft to a driven shaft by means acting automatically to accelerate the speed of the driven shaft to that of the driving shaft progressively and to insure that in the event the load on the driven shaft is greater than can be turned by the driving shaft the imparted energy will be returned to the driving shaft to increase the power delivered thereby.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

1. A power transmission comprising a housing, a drive shaft rotatably supported in said housing, a driven shaft in axial alignment with the drive shaft and rotatably supported in said housing, a gear fixed on the driven shaft, a plurality of counter-shafts rotatably supported within said housing and arranged around the axis of the driving and driven shafts, a driven gear on each of said counter-shafts in constant mesh with the gear on the driven shaft, drum structures freely mounted on each of the counter-shafts, separate yieldable means carried by said driven gears and directly disposed between the individual drum structures and the counter-shaft gears, vibrating gripping means adapted to consecutively engage the drums on the counter-shafts to impart a torque impulse thereto, and a cam on the drive shaft adapted to vibrate said vibrating gripping means in one direction while imparting driving torque through the vibrating means to the drum.

2. A power transmission comprising a housing, a drive shaft rotatably supported therein, a driven shaft rotatably supported within the housing and in longitudinal alignment with the drive shaft, a plurality of counter-shafts rotatably supported in the housing and arranged in circumferentially spaced relation to the longitudinal axis of the drive and driven shafts and parallel thereto, a gear fixed on the driven shaft, a set of driven gears freely mounted on the counter-shafts and in mesh with the gear on the drive shaft, a set of circular impulse members freely mounted on the counter-shafts, one disposed adjacent to each of the counter-shaft gears, means freely and directly interposed between said circular impulse members and their gears for individually and yieldably transmitting a torque action between the circular impulse member and its corresponding gear, a set of vibrating clutches, one mounted on each of said counter-shafts, said clutches engaging complementary impulse members and moving them a part of a revolution in a constant direction, and a cam fixed upon the drive shaft and acting to impart driving torque from the drive shaft to the vibrating clutches whereby a unidirectional impulse driving movement will be transmitted to the driven shaft.

3. A power transmission, comprising a housing having longitudinally aligned bearings in the opposite ends thereof, a drive shaft rotatably supported in one of said bearings, a driven shaft rotatably supported in the other of said bearings, other sets of aligned bearings arranged circumferentially of the axis of the drive and driven shafts, counter-shafts rotatably supported in said bearings and disposed parallel to the longitudinal axis of the first-named shafts, a gear fixed upon the driven shaft, a set of driven gears, one freely mounted on each of the counter shafts and in constant mesh with the gear on the driven shaft, a pair of yieldable energy storing elements mounted in opposition to each other on each of said counter-shaft gears, an impulse member capable of oscillating between said yieldable members, said impulse member including a circular element mounted to freely rotate, one on each of the counter-shafts, vibrating clutch means adapted to engage the circular members and to impart driving torque to them in one direction, rocker arms, one for each of said vibrating clutches whereby motion will be imparted to the vibrating clutches causing them to grip the circular member associated therewith and to rotate it around its counter-shaft, and a cam fixed upon the drive shaft to be driven thereby and to actuate the rocker arms in sequence around the shaft whereby a unidirectional torque impulse will be imparted from the drive shaft through the clutch means, the circular members, the yieldable energy storing means and the gears to the driven shaft.

4. A power transmission, comprising a rotating drive shaft, a rotatable driven shaft in axial alignment therewith, a rotating cam rotated by the drive shaft, a transmission housing within which the shafts are rotatably supported, a plurality of counter shafts separately supported for individual rotation within the housing and arranged circumferentially around the axis of the shafts, a set of rocker arms, one rotatably mounted on each of said counter shafts and engaged by the rotating cam successively to be oscillated thereby as the cam rotates, a plurality of energy storing units, one mounted on each of said counter shafts and including a primary rotatable member free upon the shaft and a secondary rotatable member fixed to the shaft and separate freely yieldable resilient means directly interposed between the primary and secondary rotatable members of each of said units for independent action, unidirectional gripping means carried by each of the rocker arms and engaging the primary rotatable member to rotate the same and to impart motion through the yieldable resilient means to the secondary member, and a driving connection between the secondary member and the driven shaft.

ROBERT V. DERRAH.